(12) United States Patent
Tomamoto et al.

(10) Patent No.: US 7,017,372 B2
(45) Date of Patent: Mar. 28, 2006

(54) MOLTEN GLASS SUPPLY DEVICE, GLASS FORMED PRODUCT, AND METHOD OF PRODUCING THE GLASS FORMED PRODUCT

(75) Inventors: Masahiro Tomamoto, Otsu (JP); Shigeaki Aoki, Otsu (JP); Tatsuya Takaya, Otsu (JP)

(73) Assignee: Nippon Electric Glass Co., Ltd., Shiga-ken (JP)

( * ) Notice: Subject to any disclaimer, the term of this patent is extended or adjusted under 35 U.S.C. 154(b) by 57 days.

(21) Appl. No.: 10/773,748

(22) Filed: Feb. 5, 2004

(65) Prior Publication Data

US 2004/0182113 A1    Sep. 23, 2004

(30) Foreign Application Priority Data

Feb. 10, 2003  (JP)  .............................. 2003-032681
Feb. 10, 2003  (JP)  .............................. 2003-032682

(51) Int. Cl.
 *C03B 5/182* (2006.01)
(52) U.S. Cl. ...................... 65/135.1; 65/135.6; 65/347; 65/374.12; 65/98; 65/29.21
(58) Field of Classification Search .............. 65/29.17, 65/29.19, 29.21, 98, 134.1, 135.1, 135.6, 65/339–347, 374.12, 355, DIG. 4; 373/27, 373/29–35; 219/50

See application file for complete search history.

(56) References Cited

U.S. PATENT DOCUMENTS 2,523,030 A  * 9/1950  Labino .......................... 65/128
2,910,806 A  * 11/1959  Russell et al. ................. 65/165
3,399,047 A  * 8/1968  Brichard ....................... 65/346
3,420,653 A  * 1/1969  Boettner ....................... 65/335
3,421,876 A  * 1/1969  Schmidt ....................... 65/346
4,227,909 A  * 10/1980  Hornyak et al. ........... 65/135.8
4,424,071 A  * 1/1984  Steitz et al. .................. 65/337
4,662,927 A  * 5/1987  Blumenfeld ................. 65/162
5,573,569 A  * 11/1996  Sorg et al. ................. 65/135.1
5,613,994 A  * 3/1997  Muniz et al. ................. 65/339

* cited by examiner

Primary Examiner—Eric Hug
(74) Attorney, Agent, or Firm—J.C. Patents

(57) ABSTRACT

A molten glass supply device is provided, which can solve unavoidable problems for high viscosity characteristics in connection with the conventional molten glass supply device for high viscosity glass. Such problems include improperly high heating cost caused by excessive heat radiation in a melting furnace, reduction in the grade of products deriving from an excess amount of an erosion foreign material and reduction in the product yield. High viscosity molten glass having a property in which a temperature at which the molten glass exhibits a viscosity of 1000 poise is 1350° C. or higher is supplied to a forming device through a melting furnace, a distribution portion in communication with the outlet of the melting furnace, and a plurality of branch paths branching from the distribution portion. In the branch paths, distribution resistance providing portions that provide distribution resistance to molten glass passed through the branch paths are provided. The supply pressure of the molten glass is equalized when molten glass is distributed from the distribution portion to the branch paths. The distribution portion has a shallower bottom than the melting furnace.

10 Claims, 5 Drawing Sheets

MOLTEN GLASS SUPPLY DEVICE, GLASS FORMED PRODUCT, AND METHOD OF PRODUCING THE GLASS FORMED PRODUCT

BACKGROUND OF THE INVENTION

1. Field of the Invention

The present invention relates to a technique of supplying molten glass. The invention more specifically relates to an improvement in a molten glass supply device that supplies molten glass exhibiting high viscosity such as sheet glass for a liquid crystal display from a melting furnace to a forming device and an improvement in a technique of producing a glass product such as sheet glass for a liquid crystal display by supplying the molten glass from the melting furnace.

2. Description of the Related Art

In recent years, there has been a rapidly increasing demand for a glass substrate for a flat panel display such as a liquid crystal display (LCD), and an electroluminescent display (ELD), cover glass for various image sensors such as a charge coupled device (CCD), a life-size magnification, solid-state contact image sensor (CIS), and a CMOS image sensor, and a glass substrate for a hard disk and a filter.

Glass for the items described above and equivalent items is high viscosity glass, while glass for items such as a glass panel or a glass funnel for a cathode ray tube (CRT), window sheet glass, a vase, and tableware and equivalent items is low viscosity glass. These kinds of glass have considerably different characteristics.

Now, let us consider high viscosity glass, non-alkali glass for a liquid crystal display and typical low viscosity glass, soda-lime glass for a container as examples. As shown in FIG. 5, as can be seen from the characteristic curve A of the glass for the liquid crystal display, the viscosity is not suitably lowered until the temperature reaches an extremely high temperature region of about 1400° C. or higher, and the smooth flow of molten glass in the molten glass supply device that will be described cannot be maintained. Meanwhile, the characteristic curve B of the soda-lime glass shows that the viscosity is suitably lowered at a temperature of about 1200° C. or lower. More specifically, in the glass for the liquid crystal display (characteristic curve A), the viscosity is 1000 poise or less at a temperature of about 1460° C. or higher. Meanwhile, in the soda-lime glass (characteristic curve B), the viscosity is 1000 poise or less at a temperature of about 1180° C. or higher.

In general, when the high viscosity glass has a viscosity of 1000 poise, the corresponding temperature is at least 1350° C. The temperature is 1420° C. or higher for particularly high viscosity glass. When the low viscosity glass exhibits a viscosity of 1000 poise, the corresponding temperature is 1250° C. or lower. The temperature is 1200° C. or lower for particularly low viscosity glass. Therefore, the high viscosity glass and the low viscosity glass can be distinguished based on the relation between the temperature and the viscosity.

Meanwhile, in producing the above-described items of high viscosity glass, high viscosity glass is supplied in the form of molten glass to a forming device and formed into a substrate of sheet glass in the device. Therefore, when these items are produced, a melting furnace serving as a supply source of molten glass and a molten glass supply device including a supply path for supplying molten glass let out from the furnace to the forming device are employed.

In the molten glass supply device, the viscosity of the molten glass must be lowered in order to smoothly supply the molten glass from the melting furnace to the forming device through the supply path. In this case, as can be clearly understood from the foregoing comparison between the characteristic curves A and B shown in FIG. 5, the temperature of high viscosity glass must be much higher than that of low viscosity glass so that these kinds of glass have the same low viscosity.

Consequently, it is more difficult for a molten glass supply device for high viscosity glass to smoothly flow molten glass than a molten glass supply device for low viscosity glass, and therefore the former device should be adapted to less impede the fluidity of molten glass. Therefore, as disclosed by Japanese Patent Laid-Open Publication No. 2000-185923 (FIG. 2), when high viscosity glass is used, for example the kind of device that supplies molten glass to the forming device from the melting furnace through a single supply path (hereinafter also referred to as "single feeder") is employed.

Meanwhile, in Japanese Patent Publication No. Sho 48-17845 and Japanese Patent Laid-Open Publication Nos. Sho 62-176927, Hei 6-24752, and 2000-313623, each of disclosed devices supplies molten glass let out from a melting furnace to a plurality of branch paths through a distribution chamber (hereinafter also referred to as "multi-feeder"). The multi-feeder is, however, for the low viscosity glass rather than the high viscosity glass described above. More specifically, Japanese Patent Publication No. Sho 48-17845 discloses "window glass" while Japanese Patent Laid-Open Publication No. Sho 62-176927 discloses "glass gob" and "glass for container." Japanese Patent Laid-Open Publication No. Hei 6-24752 includes a description of "a glass bottle" and a description of a glass composition in Table 1 that clearly suggests the low viscosity glass. Japanese Patent Laid-Open Publication No. 2000-313623 has a description of "a glass bottle and glass ware," and therefore the multi-feeder disclosed in each of the documents is clearly directed to the low viscosity glass.

A molten glass supply device for high viscosity glass must maintain molten glass in its melting furnace at extremely high temperatures (1500° C. or higher for example) using heating means. In the conventional device having a melting furnace for each supply path, however, when molten glass is supplied to a plurality of forming devices through the plurality of supply paths, heat is radiated from the entire periphery of the plurality of melting furnaces, and therefore the amount of radiated heat per unit area is inevitably large. In addition, the total heat radiation area can be large; in other words, the total amount of heat radiation can be large, which increases the cost required for heating to an improperly high level.

Furthermore, a refractory material (such as firebricks) for melting furnaces is eroded as it contacts the molten glass at high temperatures. This is for the following reasons. There are different kinds of such refractory materials available in the low temperature range and a refractory material less susceptible to erosion by contact with molten glass can be selected relatively easily for the low temperature range. In contrast, the refractory material can easily be eroded by contacting high temperature molten glass and the refractory material that can resist high temperatures in the high temperature range is limited to such a high zirconia content material. Consequently, the flexibility in choice is limited or the choice of such a less susceptible to erosion refractory material is impossible.

Therefore, as in the conventional device, if a melting furnace is provided for each supply path in a molten glass supply device for high viscosity molten glass, the entire inner wall surfaces of the plurality of melting furnaces substantially come into contact with molten glass as the glass is supplied through the plurality of supply paths to the plurality of forming devices. Consequently, the amount of erosion foreign material in the molten glass coming into the supply paths or the amount of heterogeneous glass produced due to erosion increases. The erosion foreign material or heterogeneous glass can lower the grade of glass items produced by the forming devices, and the yield can be lowered.

Meanwhile, a molten glass supply device for low viscosity glass needs only to maintain molten glass in its melting furnaces at temperatures much lower than the temperatures for the case of high viscosity glass described above. Therefore, even if the area of heat radiation is large, since the heat radiation amount per unit area is small in this case, the total heat radiation amount is not excessive or the heating cost is not improperly raised. The temperature of the low viscosity glass does not depart from the low temperature range when it is supplied to the forming devices from the melting furnaces. Therefore, the erosion of the melting furnaces can be avoided for the above reasons. Therefore if the contact area between the inner wall surfaces of the melting furnaces and the molten glass is large, the grade of the formed items is not lowered or the yield is not lowered due to erosion foreign materials.

In view of the problems associated with the excessive heat radiation and the erosion foreign materials, the use of the conventional multi-feeder to supply low viscosity glass to forming devices from melting furnaces cannot be advantageous. Meanwhile, the use of the multi-feeder for low viscosity glass whose fluidity is incomparably higher than high viscosity glass is advantageous, for example, in mass production and other purposes. This is why the multi-feeder is used for supplying low viscosity glass today.

More specifically, the disadvantages associated with excessive heat radiation and erosion foreign materials are specific to molten glass supply devices for high viscosity glass. However, in the field of producing glass products made of high viscosity glass, the problems about the heat radiation or erosion foreign materials are not even recognized as problems today. This is because in the field of high viscosity glass, it is generally believed that once the use of the single feeder as the essential configuration is given up, the fluidity of molten glass would be lowered, the forming operation using the forming device could not smoothly be performed and resulting products must have much noticeable defects. Therefore, the possible improvement at best is to modify the conventional single feeder in various manners in order to supply molten glass to the forming devices in the optimum state.

For the foregoing reasons, in the conventional molten glass supply device for high viscosity glass, no countermeasure has been taken in order to solve the problems of the heat radiation or the erosion foreign materials in the melting furnaces.

SUMMARY OF THE INVENTION

The present invention is directed to a solution to the above-described disadvantages. It is an object of the invention to prevent the problems specific to the supply of high viscosity glass such as improper increase in the heating cost caused by excess heat radiation from the melting furnaces, reduction in the grade of products caused by an excess amount of erosion foreign materials and reduction in the product yield in connection with the conventional technique of supplying molten glass with high viscosity.

In order to achieve the above-described object, a molten glass supply device according to the invention includes a melting furnace that serves as a supply source of molten glass, and a supply path that supplies molten glass let out from the melting furnace to a forming device for a glass product. The molten glass has a property in which a temperature at which the molten glass exhibits a viscosity of 1000 poise is 1350° C. or higher, and the supply path includes a distribution portion in communication with a flow outlet of the melting furnace, and a plurality of branch paths branching from the distribution portion and extending toward a plurality of the forming devices. Note that the distribution portion can preferably serve as a volume portion capable of temporarily holding the flow of molten glass, but the portion may be a simple gathering part of branch paths without such a function.

Herein, the device is for molten glass having a property in which a temperature at which the molten glass exhibits a viscosity of 1000 poise is 1350° C. or higher, and therefore the glass is high viscosity glass as can clearly be understood from the foregoing consideration and is distinguishable from low viscosity glass. Note that the molten glass having a property in which a temperature at which the molten glass exhibits a viscosity of 1000 poise is at least 1420° C. is advantageously distinguishable from low viscosity glass. The high viscosity glass contains non-alkali glass (whose alkali content is, for example, equal to or less than 0.1%, particularly equal to or less than 0.05%).

In this configuration, the plurality of branch paths extend from the melting furnace through the distribution portion, and molten glass in the melting furnace is supplied to the forming devices through the corresponding branch paths. Therefore, the value produced by dividing the heat radiation area of the melting furnace by the number of branch paths in this case, in other words, the heat radiation area of the melting furnace per branch path is far smaller than the heat radiation area of a melting furnace per supply flow path of a plurality of single feeders having a plurality of melting furnaces whose total volume is equal to the volume of the melting furnace according to the invention. Stated differently, if the volume of the melting furnace according to the invention is equal to the total volume of the melting furnaces of the plurality of conventional single feeders, the heat radiation area of the melting furnace per branch path according to the invention is far smaller than the heat radiation area of the furnace per supply path of the conventional single feeder. In this way, the heat radiation area of the melting furnace per one branch path is far smaller than that of the conventional device (single feeder), the amount of radiated heat from the melting furnace per branch path is not excessive, and the necessary heating cost per forming line can be prevented from becoming improperly high, which contributes to reduction in the manufacturing cost.

Furthermore, in this configuration, the value produced by dividing the area of the inner wall surface of the melting furnace in contact with molten glass by the number of the branch paths, in other words, the eroded area of the melting furnace per branch path is far smaller than the eroded area of the melting furnace per supply flow path in a single feeder. In this way, the amount of erosion foreign material or the amount of heterogeneous glass mixed into the molten glass supplied to the forming devices through the corresponding branch paths produced by erosion is not excessive, and contamination of molten glass or reduction in the quality of finished products caused by the contamination and hence reduction in the product yield can be prevented.

In this case, the branch paths may extend radially from the distribution portion or parallel to each other toward the forming devices, but for the purpose of eliminating the possibility of problems such as inequality in the viscosity of molten glass or reduction in the fluidity, all the branch paths preferably extend straightforward when viewed from the top.

As a technique related to the invention, Japanese Patent Publication No. Sho 48-17845 and Japanese Patent Laid-Open Publication Nos. Sho 62-176927, Hei 6-24752, and 2000-313623 disclose a multi-feeder that supplies molten glass let out from a melting furnace to a plurality of branch paths through a distribution chamber. The multi-feeder disclosed in the publications, however, supplies low viscosity glass as the molten glass as described above. The multi-feeder for the low viscosity glass need only supply molten glass at temperatures far lower than the high viscosity glass described above. Therefore, if the heat radiation area of the melting furnace is large, the heat radiation per unit area is small, and therefore the heating cost is not improperly raised because of excessive heat radiation or the manufacturing cost is not raised. Furthermore, the erosion of the melting furnace can be prevented in the low temperature range for the reasons already described, so that there is no such problem as erosion foreign material or heterogeneous glass that reduces the product yield. Therefore, for low viscosity glass, in view of the problems associated with the excessive heat radiation from the melting furnace and the erosion foreign materials, there is not much difference between the use of the single feeder and the use of the multi-feeder. Consequently, the use of the multi-feeder neither prevents the heating cost from improperly increasing, nor reduces the manufacturing cost, nor advantageously improves the quality of glass products or the product yield by reducing the amount of erosion foreign materials or the like. In consideration of the foregoing, the multi-feeder for the low viscosity glass is based on a technological concept entirely different from the invention.

Furthermore, in the above-described configuration according to the invention, the molten glass distributed from the same melting furnace for supply can advantageously be formed into different kinds of glass products, simultaneously. Furthermore, when the supply of molten glass is stopped from one of the branch paths, the molten glass can be supplied to the forming devices through the other branch paths so that the prescribed forming step can be carried out. Therefore, when the user desires to change the shape of glass product from one shape to another different shape, it is not necessary to stop the supply of the molten glass through all the branch paths, but only the branch path corresponding to the line desired to be changed is stopped, and the forming device is replaced, while the other forming devices may continue to operate. This improves the production efficiency.

In this configuration, distribution resistance providing portions for providing distribution resistance to molten glass let to flow through the branch paths are preferably provided in the branch paths, respectively. In this case, the distribution resistance providing portions are preferably provided at the immediately downstream side of the distribution portion in the respective branch paths, in other words, at the respective upstream ends of the branch paths.

In this configuration, the following advantages are provided. If positive distribution resistance is not given to the molten glass let to flow through the branch paths, the part of the molten glass having relatively low viscosity is let to flow from the distribution portion through the branch paths at relatively high speed. Meanwhile, the part of the molten glass having relatively high viscosity is let to flow from the distribution portion through the branch paths at relatively low speed. Consequently, the supply pressure of the molten glass from the distribution portion to the respective branch paths is unequal. Meanwhile, distribution resistance given to the molten glass through the branch paths causes both the parts of the molten glass with relatively high viscosity and low viscosity to have their speeds extremely lowered in the branch paths, so that their flow rates may be approximately equal to each other. Stated differently, distribution resistance necessary to equalize their flow rates should be given in each branch path. In this way, the supply pressures of the molten glass distributed from the distribution portion for supply to the branch paths can be equalized to each other. Therefore, the forming operation can be carried out smoothly without trouble, and variations or reduction in the quality of the glass products and reduction in the product yield can be prevented.

Particularly in recent years, liquid crystal displays have widely spread, and the displays have larger panels, so that the demand for sheet glass forming the liquid crystal device rapidly increases. When the large size panel is employed, even a slight difference in the composition or material characteristics between two sheet glasses having liquid crystal in-between is likely to cause pitch shifts at the time of producing the panel. Therefore, glass having a prescribed composition and prescribed material characteristics is needed in volume, and the increase in the demand for this kind of sheet glass may be addressed by increasing the number of the conventional molten glass supply devices (single feeders). However, by this simple method, sheet glass produced by the different single feeders may not have the same composition or equal material characteristics even with the same kind, because the operation and preparation conditions are different. Meanwhile, in the molten glass supply device according to the invention, the path from the melting furnace branches into a plurality of supply paths (branch paths), and therefore the recent increased demand can readily be addressed, and for even sheet glass formed through different branch paths, the operation and preparation conditions can be the same, and the composition and the material characteristics can be equalized accordingly. Therefore, sheet glass having a prescribed composition and prescribed material characteristics can be supplied in volume.

Furthermore, in the above configuration, the supply pressures when the molten glass is distributed from the distribution portion for supply to the respective branch paths are preferably equalized to each other.

Herein, the equalization of the supply pressure refers to the state in which there is no improper variation in the amount of molten glass distributed for supply to the branch paths, and the fluidity of the molten glass flowing through the branch paths after the distribution and supply is equalized. Therefore, the molten glass that continues to come into the distribution portion from the melting furnace is appropriately supplied to the forming devices without much difference in the amount through the branch paths, and the step of forming by the forming devices can be carried out in homogeneous conditions with appropriate certainty. In this way, the forming operation can be sufficiently smooth, while variation in the quality of the formed products and reduction in the quality and product yield can surely be prevented.

In this configuration, at least a surface of an inner wall of the distribution resistance providing portion in contact with the molten glass is preferably made of platinum, molybdenum, palladium, rhodium, or an alloy thereof (hereinafter referred to as "platinum or the like"), more preferably of platinum or a platinum alloy.

In this way, when the high viscosity glass is supplied as molten glass, a distribution resistance providing portion having sufficient durability can be obtained. More specifically, platinum or the like having high heat resistance and high erosion resistance is unlikely to be thermally distorted or eroded when it is contacted with extremely high temperature molten glass made of high viscosity glass and therefore the distribution resistance providing portion may have a long useful life. In this way, the inner wall surface of the distribution resistance providing portion is not eroded by contacting the high viscosity molten glass, and therefore erosion foreign materials are not mixed or dissolved into the molten glass or reduction in the quality of the formed product or reduction in the product yield is not caused accordingly. In this case, all the wall portion of the contact part of the distribution resistance providing portion may be made of platinum or the like. However, since the platinum or the like is expensive, the main body of the distribution providing portion is made of a refractory material (such as firebricks) and at least the surface of the inner wall in contact with molten glass is preferably covered with a thin plate of platinum or the like. The use of platinum or the like having heat resistance to at least 1350° C. (preferably at least 1420° C.) and erosion resistance allows both heat resistance and erosion resistance treatment at a time, and the labor or trouble required for the treatment may be reduced.

Furthermore, preferably there is energizing (or direct electric) heating means for heating molten glass by supplying current through the platinum or the like.

In this way, the platinum or the like is provided with current using the energizing (or direct electric) heating means, so that the molten glass in the distribution resistance providing portion is heated. Since the molten glass is heated through the direct contact part of the distribution resistance providing portion, in comparison with the case of heating using burners, the heating efficiency is improved, and the molten glass can uniformly be heated. When the heating by energizing (or direct electric heating) is carried out, and heating with a burner is combined, the molten glass may be heated more efficiently and uniformly than heating only with the burner.

In this case, when temperature detection means that detects the temperature of the molten glass in each of the distribution resistance providing portions is provided and the current applied to the platinum or the like is variably controlled in response to the signal from the temperature detection means, the temperature of the molten glass in each of the distribution resistance providing portions can be maintained at the optimum level. Therefore, the distribution resistance providing portion also serves as the temperature control portion that controls the temperature of the molten glass.

As in the foregoing configuration, each of the distribution resistance providing portions is preferably composed of a baffle plate provided in the branch path. Note that each of the distribution resistance providing portions is preferably provided with a plurality of baffle plates from the upstream side to the downstream side. A plurality of baffle plates different in locations with respect to the section of the flow path of the molten glass and/or in shapes are preferably provided.

In this way, in the distribution resistance providing portion, baffle plates can be provided by simply fixing them in the branch paths, preferably immediately downstream of the distribution portion, which alleviates the labor or trouble required for manufacturing, and the distribution resistance to the molten glass can surely be given. The baffle plates can change the direction of the flow of the molten glass or narrow the flow, so that heat transfer between the parts of the molten glass having different viscosity can be promoted. The molten glass in the distribution resistance providing portions can have its flow rectified and its viscosity equalized. Therefore, the distribution resistance providing portion also serves as a viscosity equalizing portion for the molten glass.

In this configuration, at least the surface of the baffle plate in contact with the molten glass is preferably made of platinum or the like. In this case, the use of the platinum or the like, particularly platinum or a platinum alloy having both heat resistance to at least 1350° C. (preferably at least 1420° C.) and erosion resistance is preferable. The main body of the baffle plates can be made of another heat resisting material, and the contact surface with molten glass may be covered with a thin plate of platinum or the like. The baffle plates do not need high rigidity or a large area, and therefore the baffle plates themselves are preferably made of plates of platinum or the like.

In this way, the baffle plates may have improved durability against the heat of the molten glass and withstand long term use, and the erosion foreign material produced by the contact with molten viscosity glass can be prevented, so that reduction in the quality of a formed product caused by the erosion foreign material dissolved into the molten glass or reduction in the product yield can be prevented.

In the foregoing configuration, the distribution portion preferably has a bottom shallower than the melting furnace.

More specifically, the molten glass to be let out from the melting furnace to the distribution portion has relatively high viscosity in the lower part as compared to the higher part because the lower part is at lower temperatures. In consideration of the difficulty to keep molten glass at extremely high temperatures (such as 1500° C. or higher), this could inevitably be caused based on the relation between the specific gravity and the temperature. Meanwhile, when the heating means includes burners, flames from the burners are necessarily directed within the space above the molten glass in the melting furnace. Therefore, the temperature difference between the upper and lower parts of the molten glass and the viscosity difference caused by the temperature difference can be extremely large. Therefore, when the distribution portion has a bottom shallower than that of the melting furnace, the lower part, high viscosity molten glass remains in the melting furnace, and only the upper part, low viscosity molten glass is let into the distribution portion. In this way, the low viscosity part of the molten glass is efficiently used and not wasted, the molten glass can have equal viscosity from the upper to lower parts in the distribution portion and the release of bubbles contained in the molten glass can be facilitated. Note that the heating means is based on electric melting process or/and heating with burners, the temperature difference between the upper and lower parts of the molten glass can be somewhat lower than the case of heating only by the burners as described above. However, the molten glass must be heated to extremely high temperatures, and therefore it is difficult to reduce the temperature difference to an appropriate degree. Therefore, if the electric melting process is employed, the advantage provided by making the bottom of the distribution portion shallower than the melting furnace can naturally be provided.

In addition, an erosion foreign material such as zirconia is mixed into molten glass in the melting furnace when the melting furnace is made of a high zirconia content refractory material. The zirconia having a larger specific gravity than the molten glass is deposited in the lower part of the molten glass or dissolved into the molten glass to degrade the glass and is deposited in the lower part. Even in the case, the distribution portion having a bottom shallower than the melting furnace allows only the upper part of the molten glass that has less erosion foreign material or heterogeneous glass is let into the distribution portion. If only a part of the distribution portion on the melting furnace side has a shallow bottom, the same advantage can be brought about. Note that such a partly shallow bottom part may be provided at the boundary between the distribution portion and the melting furnace (including a part of the melting furnace).

In this configuration, the depth of the distribution portion is preferably equal to, or less than, $4/5$ the depth of the melting furnace. Herein, "the depth of the distribution portion" and "the depth of the melting furnace" refer to their depths from the liquid level of the molten glass to the respective bottoms when the molten glass is let out from the melting furnace to the distribution portion in the forming step by the forming device so that the liquid level of the flow is approximately equal from the melting furnace to the distribution portion.

In this way, when the depth of the distribution portion is about equal to, or less than, $4/5$ the depth of the melting furnace, at least $1/5$ the amount of the molten glass including the lower part having highest viscosity and contaminated with the erosion foreign material in the melting furnace can be prevented from coming into the distribution portion. In other words, at most $4/5$ the amount of the molten glass including the part having lowest viscosity and not contaminated with the erosion foreign material can be let into the distribution portion. Therefore, only the clean part of the molten glass with appropriately low viscosity comes into the distribution portion, so that molten glass with preferable characteristics in the melting furnace can effectively be used. Furthermore, the viscosity of the molten glass in the distribution portion can appropriately be equalized, so that the release of bubbles contained in the molten glass can be facilitated. Meanwhile, if the above setting ratio is over $4/5$, part of the contaminated, high viscosity glass remaining in the lower part of the melting furnace also comes into the distribution portion. This is likely to prevent the molten glass in the distribution portion from being equalized in the viscosity or from being defoamed. In this case, to ensure the above advantage, the depth of the distribution portion is preferably equal to, or less than, $3/5$ the depth of melting furnace, more preferably equal to, or less than, $1/2$ the depth. For any of the above settings, the depth of the distribution portion is preferably at least $1/20$ that of the melting furnace, so that the heat quantity and the heating cost for the molten glass in the melting furnace are not wasted.

A foreign material such as silica may float like a piece of film on the liquid surface of the molten glass in the melting furnace in some cases, and two or more melting furnaces may be provided in series and communication from the upstream side to the downstream side for the purpose of removing the film-like floating substance. In the relation between the melting furnaces and the distribution portion, the depth of the distribution portion is preferably equal to, or less than, $4/5$ (or equal to, or less than, $3/5$ or $1/2$) the depth of the deepest melting furnace, and has a bottom shallower than the melting furnace in the immediate vicinity of the distribution portion.

In the above configuration, the depth of the distribution portion is preferably equal to, or less than, 500 mm.

When the depth of the distribution portion is equal to, or less than, 500 mm, the distance from the bottom to the liquid surface is not improperly long, so that the temperature difference between the upper and lower parts of molten glass coming into the distribution portion can suitably be reduced, which can be advantageous in equalizing the viscosity of molten glass in the distribution portion. Meanwhile, when the depth of the distribution portion is more than 500 mm, the distance from the bottom to the liquid surface is improperly long, which can prevent the molten glass in the distribution portion from having a equalized viscosity. In the case, in order to surely provide the above described advantage, the depth of the distribution portion is equal to, or less than, 400 mm. Note that when a large glass product such as a glass substrate for a flat panel display such as a liquid crystal display is formed by the forming device for example, a relatively large amount of molten glass must be supplied from the distribution portion to the branch path, and therefore the depth of the distribution portion is preferably not less than 50 mm.

In this configuration, heating means that heats molten glass in the distribution portion so that the molten glass has a viscosity of 1000 poise or less is preferably provided.

More specifically, molten glass must smoothly be distributed from the distribution portion for supply to the branch paths. However, if the viscosity of the molten glass coming into the distribution portion from the melting furnace becomes high before coming into the branch paths due to the lowered temperature, the distribution and supply cannot smoothly be carried out. Therefore, the heating means is used to heat the molten glass in the distribution portion so that the viscosity of the glass is kept 1000 poise or less, so that the molten glass can smoothly be distributed and supplied to the branch paths from the distribution portion. The viscosity of the molten glass in this case may be slightly higher than 1000 poise when the flow direction is along a straight line, and still a smooth flow is secured without problems. However, there are flows in complicated directions in the distribution portion, so that the viscosity has to be equal to, or less than, 1000 poise in order to maintain the smooth flow.

In this case, the heating means for heating the molten glass in the distribution portion, and the heating means for heating the molten glass in the melting furnace are used to make the viscosity of the molten glass in the distribution portion lower than the viscosity of the molten glass in the melting furnace. More specifically, the temperature of the molten glass in the distribution portion is preferably higher than the temperature of the molten glass in the melting furnace. In this way, the flow of the molten glass in the distribution portion more complicated than the flow in the melting furnace can be addressed more appropriately. In addition, since the volume of the distribution portion is far smaller than that of the melting furnace, the molten glass can be raised in temperature easily and less costly by the heating means.

Note that the viscosity of the molten glass in the distribution portion is preferably lower than the viscosity of the molten glass in the distribution resistance providing portion, and among their viscosity and the viscosity of the molten glass in the melting furnace, the viscosity of the molten glass in the distribution portion is preferably the lowest. The heating means by burners that heat the inside the melting furnace and the distribution portion is preferably oxygen fuel combustion so that high temperature heating (such as heating at about 1700° C.) is possible.

In this configuration, at least the surface of the inner wall of the distribution portion at the inner wall surface in contact with the molten glass is preferably made of platinum or the like.

In this case, the use of platinum or the like having heat resistance to at least 1350° C. (preferably at least 1420° C.) and erosion resistance allows both heat resistance and erosion resistance treatment at a time, and the labor or trouble required for the treatment may be reduced. Note that all the wall portion of the contact part of the distribution portion may be made of platinum or the like, but platinum or the like is costly, and therefore, the main body of the distribution portion is made of a refractory material (such as firebricks), and the surface of the inner wall in contact with the molten glass is preferably covered with a thin plate of platinum or the like.

In this way, the heat resisting treatment and the erosion resisting treatment are both provided at the distribution portion, the anti-heat durability of the distribution portion is improved and the useful life is prolonged. In addition, an erosion foreign material or heterogeneous glass can be prevented from being generated in the distribution portion, and the reduction in the quality of products or the yield due to the contamination of the erosion foreign material can be prevented. Note that the melting furnace made of a refractory material can be subjected to the same treatment, but the volume of the melting furnace is far larger than the volume of the distribution portion and the distribution resistance providing portion, and therefore such treatment is not advantageous and had better not be provided in consideration of the cost. Furthermore, the measure can be taken so that the erosion foreign material or other substances can be prevented as described above, and therefore the above treatment is preferably not provided.

In the above configuration, the forming device is preferably a forming device for sheet glass.

Molten glass supplied from the molten glass supply device having the above configuration can be formed into high grade, glass products including sheet glass by the forming device.

In this case, the forming device for glass sheet may be a down draw forming device, an up draw forming device, and a float forming device. The down draw forming device may be an overflow forming device and a slot down forming device. Among them, the overflow forming device that does not require polishing of the surface of formed sheet glass is preferably employed. Sheet glass formed by the forming devices includes a glass substrate for a flat panel display such as a liquid crystal display and an electroluminescent display, cover glass for various image sensors including a charge coupled device, a life-size magnification, solid-state contact image sensor, and a CMOS image sensor, and a glass substrate for a hard disk and a filter.

In forming these kinds of sheet glass, the molten glass supplied to the forming devices having unequal viscosity can cause resulting glass sheet to have defects such as thickness deviation and waviness, and the product yield can be lowered. These are critical problems when the sheet glass is used for a glass substrate for a liquid crystal display that requires a particularly high quality. As described above, according to the invention, the problem of unequal viscosity can appropriately be addressed, and the sheet glass of the kinds described above can suitably be produced according to the invention.

The method of producing a glass product according to the invention directed to the above described technical problem includes the steps of melting raw materials to obtain high viscosity glass in a melting furnace, the high viscosity glass having a property in which a temperature at which the molten glass exhibits a viscosity of 1000 poise is 1350° C. or higher (preferably at 1420° C. or higher); distributing molten glass coming out from the melting furnace through a distribution portion in communication with an outlet of the melting furnace for supply to a plurality of branch paths; and supplying the molten glass passed through the plurality of branch paths to forming devices in communication with the plurality of branch paths and forming glass products.

According to the manufacturing method, the basic advantage by the use of the molten glass supply device described above, in other words, the advantage that is brought about because the molten glass supply device includes a melting furnace, a distribution portion, and branch paths can be provided.

Furthermore, the manufacturing method preferably further includes the step of providing distribution resistance to molten glass flowing through the plurality of branch paths.

According to the method, in addition to the basic advantage described above, the above-mentioned advantage by the distribution resistance providing portions provided in the branch paths can be provided.

In carrying out these manufacturing methods, supply pressure when molten glass is distributed from the distribution portion to the branch paths is preferably equalized, so that the detailed advantage the same as what is described above can be provided. At least the surface of the inner wall of the distribution resistance providing portion in contact with the molten glass is preferably made of platinum or the like, and the heat resistance treatment to at least 1350° C. and the erosion resistance treatment are preferably provided by the platinum or the like. Energizing (or Direct electric) heating means for heating the molten glass by applying current to the platinum or the like is preferably provided. The distribution resistance providing portion is preferably composed of baffle plates in the branch paths. At least the surface of baffle plates in contact with the molten glass is preferably made of platinum or the like. The distribution portion preferably has a bottom shallower than that of the melting furnace. The depth of the distribution portion is preferably equal to, or less than, ⅘ the depth of the melting furnace and the depth of the distribution portion is preferably equal to, or less than, 500 mm. Preferably, there is heating means for heating molten glass in the distribution portion so that the glass has a viscosity of 1000 poise or less. At least the surface of the inner wall of the distribution portion in contact with the molten glass is preferably made of platinum or the like. The forming device is preferably a forming device for sheet glass (particularly a glass substrate for a flat panel display).

As in the foregoing, in the molten glass supply device according to the invention, molten glass having a property in which a temperature at which the molten glass exhibits a viscosity of 1000 poise is 1350° C. or higher is supplied to the forming devices through the melting furnace, the distribution portion in communication with the outlet of the melting furnace, and a plurality of branch paths branching from the distribution portion. Therefore, as compared to the conventional device (single feeder), the heat radiation area of the melting furnace per branch path is far smaller, and the necessary heating cost for individual forming lines can be reduced, which reduces the product cost. In addition, the erosion area of the melting furnace per branch path is far smaller than that of the conventional device, and the erosion foreign material or heterogeneous glass can be reduced in amount in the molten glass supplied to the forming devices through the branch paths. Thereby, degradation in the product quality or reduction in the product yield caused by the contamination of the molten glass can be prevented. Furthermore, molten glass supplied and distributed from the same furnace can be formed into different glass products at a time. When the supply of molten glass from one of the branch paths is stopped, the molten glass can be supplied to the forming devices through the other branch paths and a necessary forming step can be carried out. In addition, the path from the melting furnace branches into a plurality of paths, and therefore the recent increasing demand for sheet glass can readily be met without additional molten glass supply devices. Sheet glass even formed through different branch paths is operated or prepared in the same conditions, and therefore sheet glass having the same composition and material characteristics can be supplied in volume.

If there are the distribution resistance providing portions that provide distribution resistance to the molten glass flowing in the branch paths, the flow rate in the branch paths is extremely lowered both for relatively high and low viscosity parts of the molten glass, so that the supply pressure of the molten glass from the distribution portion to the branch paths can be equalized, and the operation of forming high viscosity glass can smoothly be carried out with ease and variations and reduction in the quality of glass products or reduction in the product yield can be prevented.

If the distribution portion has a bottom shallower than the melting furnace, high viscosity molten glass and molten glass containing an erosion foreign material mixed or dissolved remain in the lower part of the melting furnace, and only the upper, low viscosity molten glass part and the molten glass part not contaminated by the erosion foreign material are let into the distribution portion, so that the viscosity of the molten glass from the upper part to the lower part of the distribution portion can be equalized. The release of bubbles contained in the molten glass can be facilitated, and the quality and yield of the formed products can be improved.

DETAILED DESCRIPTION OF THE PREFERRED EMBODIMENTS

Figure 1:
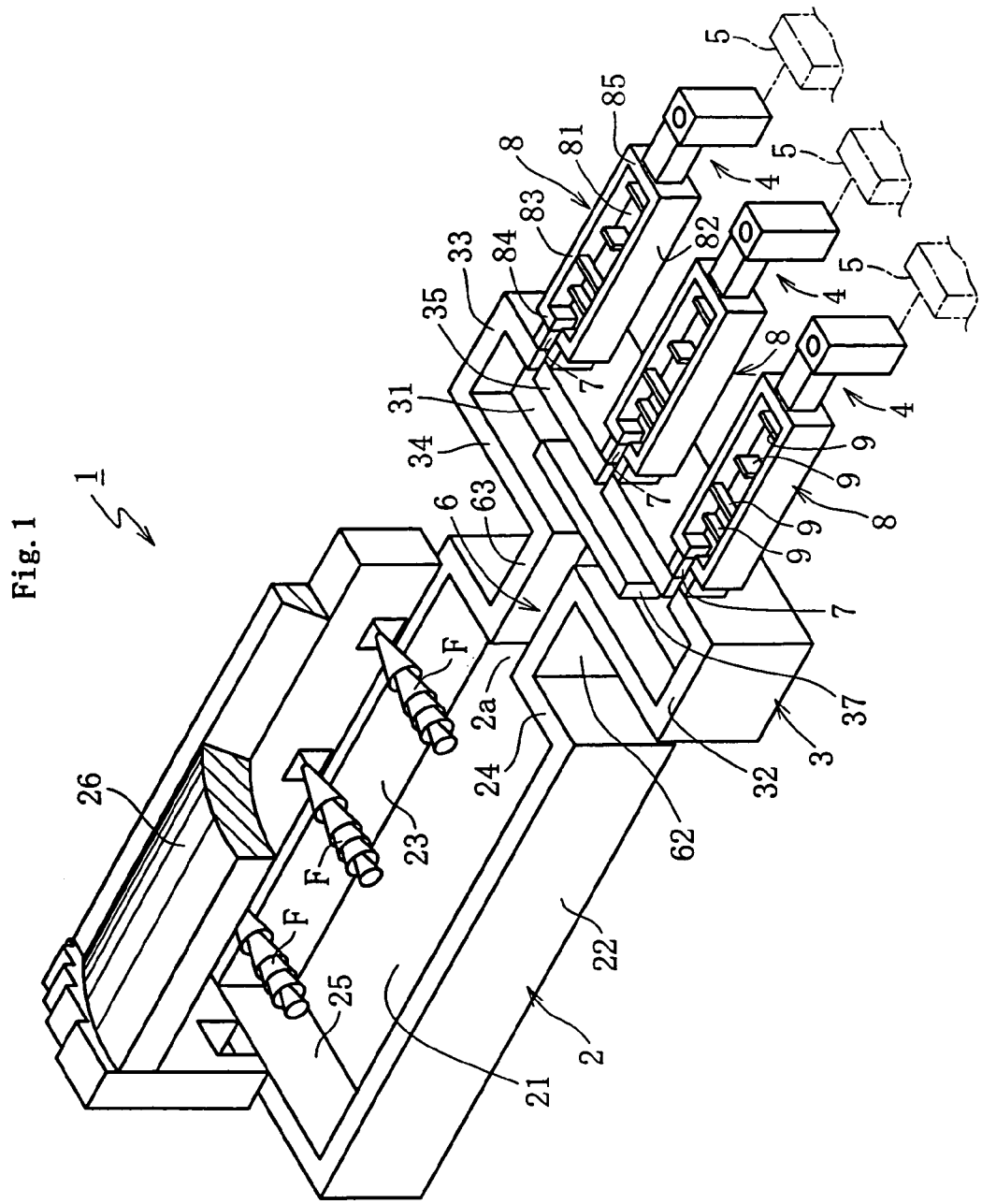
FIG. 1 is a partly cut-away, schematic perspective view of the general configuration of a molten glass supply device according to an embodiment of the invention.
Figure 2:
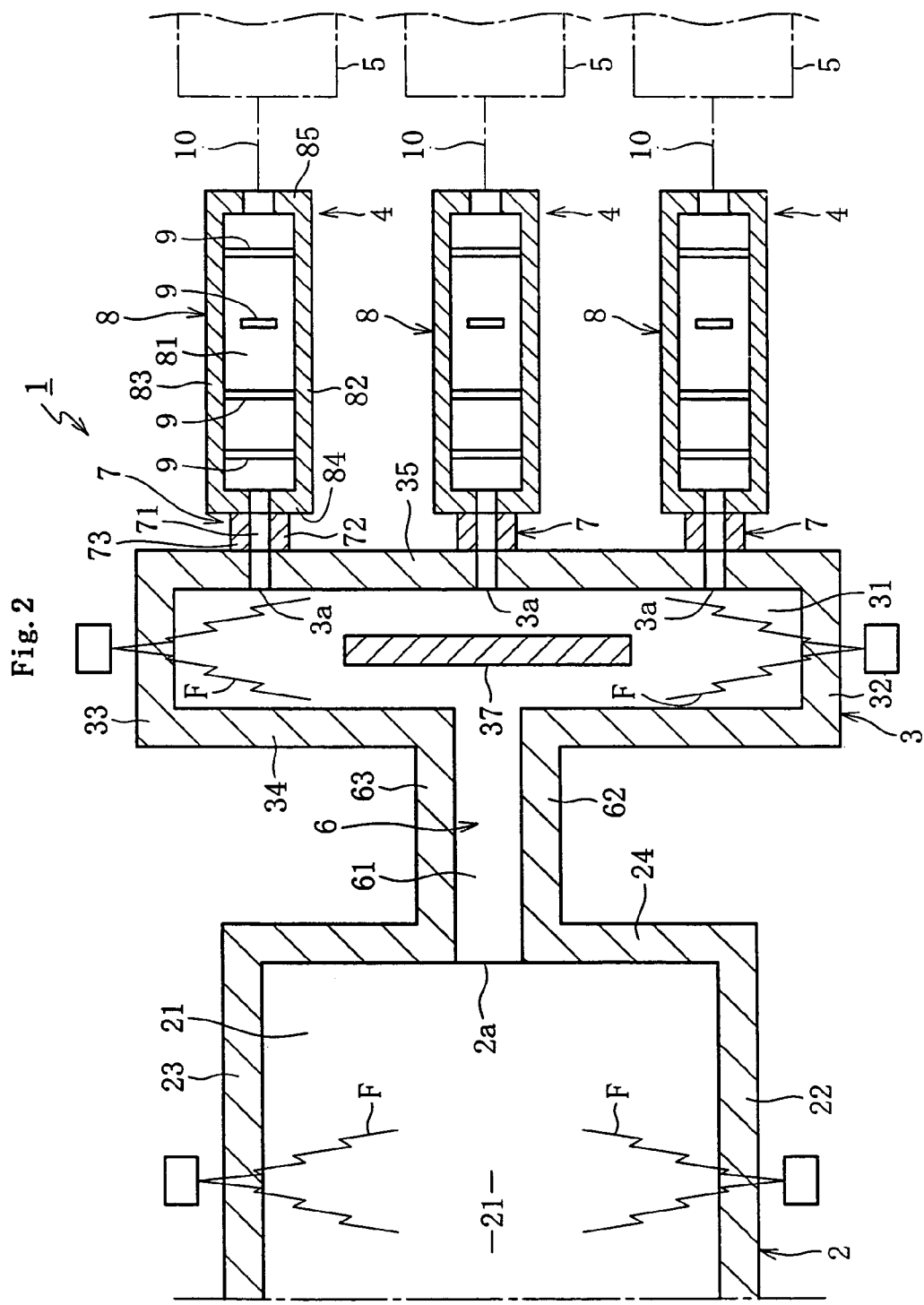
FIG. 2 is a horizontal sectional plan view showing an essential part of the molten glass supply device according to the embodiment.
Figure 3:
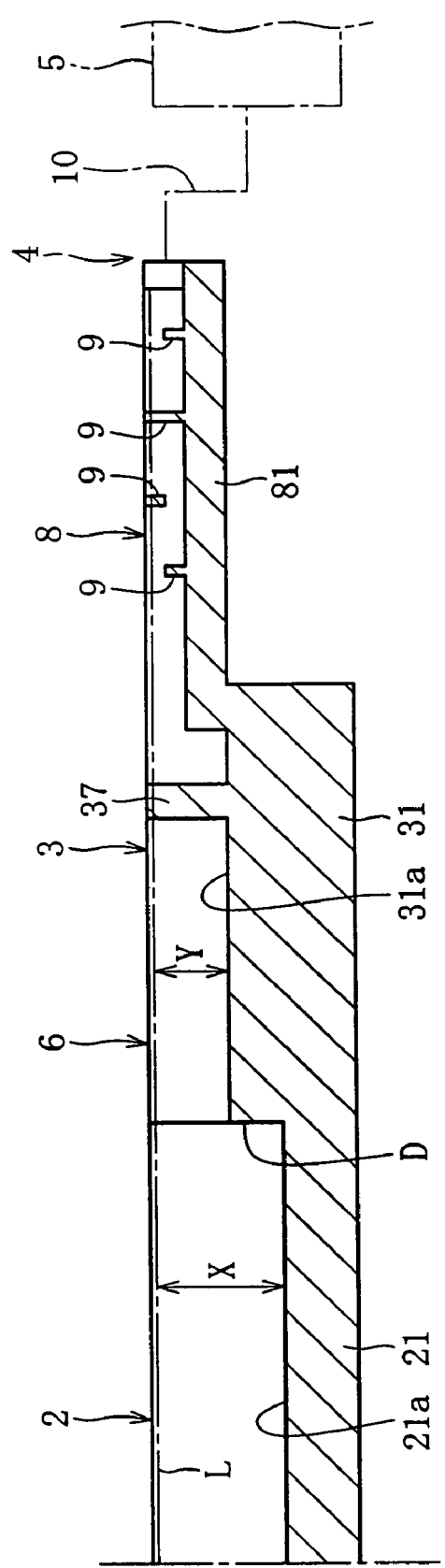
FIG. 3 is a vertical sectional side view showing the essential part of the molten glass supply device according to the embodiment.

Now, an embodiment of the invention will be described in conjunction with the accompanying drawings. FIG. 1 is a partly cutaway perspective view of the general configuration of a molten glass supply device according to an embodiment of the invention. FIG. 2 is a horizontal sectional plan view of an essential part of the molten glass supply device, and FIG. 3 is a vertical sectional side view of the essential part of the molten glass supply device. Note that in the following description, the directions between the upstream and downstream sides of the molten glass supply device will also be referred to as the back-and-forth direction, and the direction orthogonal to the back-and-forth direction in the horizontal plane is also referred to as the right-to-left direction.

Now, referring to FIGS. 1 and 2, the general configuration of a molten glass supply device 1 according to the embodiment of the invention will be described. The molten glass supply device 1 includes a substantially rectangular melting furnace 2, a distribution chamber (distribution portion) 3, and a plurality of branch paths 4. The melting furnace 2 serves as a supply source of molten glass, the distribution chamber 3 is communicated with a flow outlet 2a of the melting furnace 2, and the branch paths 4 are provided at approximately equal intervals at the downstream end of the distribution chamber 3 and communicated with each other. The downstream side ends of these branch paths 4 are communicated with a plurality of forming devices 5. Note that there are three paths through the branch paths 4 to the forming devices 5 by way of illustration, but the number of paths may be two or four or more. There may be two or more melting furnaces 2 provided for example in communication and in series or parallel to each other from the upstream side to the downstream side.

The melting furnace 2 has a bottom wall 21, side walls 22 to 25, and an arch-shaped ceiling wall 26 covering the entire top of these walls. The walls are made of a high zirconia content refractory material (such as firebricks), and flames F from a plurality of burners are directed toward the space above the molten glass from above both the left and right side walls 22 and 23. The flames F from the burners heat molten glass filled within the melting furnace 2 from above and keep the glass at temperatures in the range from 1500° C. to 1650° C.

The flow outlet 2a is formed in the center of the right-and-left direction on the side wall 24 on the downstream side of the melting furnace 2. The melting furnace 2 and the distribution chamber 3 are communicated through a narrow flow path 6. The flow outlet 2a is at the upstream end of the path. The distribution chamber 3 has a bottom wall 31, side walls 32 to 35, and an arch-shaped ceiling wall (not shown) covering the entire top of these walls. These walls are made of a high zirconia content refractory material (firebricks). The flow path 6 has a bottom wall 61, side walls 62 and 63, and an arch-shaped ceiling wall (not shown) covering the entire top of these walls. These walls are also made of a high-zirconia content refractory material (firebricks). Flames F from burners are directed toward the space above molten glass from above both the right and left side walls 32 and 33 of the distribution chamber 3. In this case, the molten glass in the distribution chamber 3 is maintained at temperatures in the range from 1600° C. to 1700° C.

The distribution chamber 3 has a volume smaller than that of the melting furnace 2, a thin plate of platinum or a platinum alloy is provided on the inner surface of the bottom wall 31 and the side walls 32 to 35 (at least the part of the inner wall surface in contact with the molten glass). Similarly, a thin plate of platinum or a platinum alloy is provided on the inner wall surface of a bottom wall 61 and side walls 62 and 63 of the flow path 6. The distribution chamber 3 is elongated in the right-and-left direction, and the downstream end of the flow path 6 is open in the center of the upstream side wall 34 in the right-and-left direction. A rectifying plate 37 is elongated in the right-and-left direction and fixed with a distribution space each between all the side walls 32 to 35 and itself. Note that the rectifying plate 37 is also made of a high zirconia content refractory material (firebricks), and a thin plate of platinum or a platinum alloy is provided on the outer surface thereof.

In this case, as shown in FIG. 3, the distribution chamber 3 has a bottom shallower than the melting furnace 2. More specifically, with reference to the liquid level L of the molten glass during the operation of the device 1, the depth X to the bottom 21a of the melting furnace 2 is longer than the depth Y to the bottom 31a of the distribution chamber 3. More specifically, the depth Y of the distribution chamber 3 is equal to, or less than, ⅘ the depth X of the melting furnace 2, preferably equal to, or less than, ⅗ the depth, more preferably equal to, or less than, ½ the depth and at least 1/20 the depth. The depth Y of the distribution chamber 3 is equal to, or less than, 500 mm, more preferably equal to, or less than, 400 mm, and at least 50 mm. Note that according to the embodiment, the flow path 6 is as deep as the distribution chamber 3, and there is a step D at the boundary between the melting furnace 2 and the flow path 6.

As shown in FIGS. 1 and 2, at the downstream side wall 35 of the distribution chamber 3, a plurality of small flow outlets 3a are formed at approximately equal intervals. The plurality of branch paths 4 are communicated to the downstream side of the distribution chamber 3 through small flow paths 7, respectively, and the small flow outlets 3a are provided at the upstream ends of the paths. The plurality of branch paths 4 are provided parallel to each other and all extend on a straight line when viewed from the top.

A plurality of distribution resistance providing chambers (distribution resistance providing portions) 8 are formed at the upstream end of the branch paths 4, in other words, immediately on the downstream side of the distribution chamber 3. The downstream opening ends of the small flow paths 7 are connected to the distribution resistance providing chambers 8. The distribution resistance providing chambers 8 are elongated in the back-and-forth direction and have a volume smaller than the distribution chamber 3. The distribution resistance providing chambers 8 each has surrounding walls 81, 82, 83, 84, and 85 defining a flow path, and a ceiling wall (not shown) covering the entire top. These walls are made of a high zirconia content refractory material (firebricks). The small flow paths 7 each has passage walls 71, 72, and 73, and a ceiling wall (not shown) covering the entire top of these walls. These walls are also made of a high zirconia content refractory material (firebricks). Note that the distribution resistance providing chambers 8 each has a bottom shallower than that of the distribution chamber 3.

A thin plate of platinum or a platinum alloy is provided on the inner wall surface of the surrounding walls 81, 82, 83, 84, and 85 of the distribution resistance providing chambers 8 (at least on the part of the inner wall in contact with the molten glass). Similarly, a thin plate of platinum or a platinum alloy is provided on the inner wall surface of the passage walls 71, 72, and 73 of the small flow paths 7. The molten glass in the distribution pressure providing chambers 8 is heated by current passed through the thin plate of platinum or a platinum alloy as described above by energizing (or direct electric) heating means that is not shown. Temperature detecting means (a temperature sensor) that is not shown is provided in each of the distribution resistance providing chambers 8 in order to detect the temperature of molten glass and hence the viscosity thereof. The amount of current and hence the quantity of heat are controlled at the time of heating by energizing (or direct electric heating) in response to a signal from these temperature detection means.

Therefore, the distribution resistance providing means 8 can also serve as a temperature adjusting chamber (temperature adjusting portion). By the control described above, the temperature of the molten glass in the distribution resistance providing chambers 8 is maintained in the range from 1500° C. to 1650° C.

The distribution resistance providing chambers 8 are each provided with baffle plates 9 made of platinum or a platinum alloy for narrowing the flow of the molten glass passing through the chambers while changing the flow direction. The baffle plates 9 are fixed parallel to each other in the back-and-forth direction at prescribed intervals. The baffle plates 9 eventually provide resistance to the molten glass passed through the distribution resistance providing chambers 8. Stated differently, the molten glass, whether its high viscosity part or low viscosity part, is prevented from directly passing through the upstream end of the branch paths 4 with almost no resistance. These baffle plates 9 and the distribution resistance providing chambers 8 therefore serve as distribution pressure adjusting means to equalize the supply pressure when the molten glass is distributed for supply to the branch paths 4 from the distribution chamber 3.

FIGS. 4(a) to 4(e) are front views showing the baffle plates 9 in the distribution resistance providing chamber 8 sequentially from the upstream side. Note that the chain line L in these figures represents the liquid level of the molten glass during the operation of the device 1.

Figure 4A:
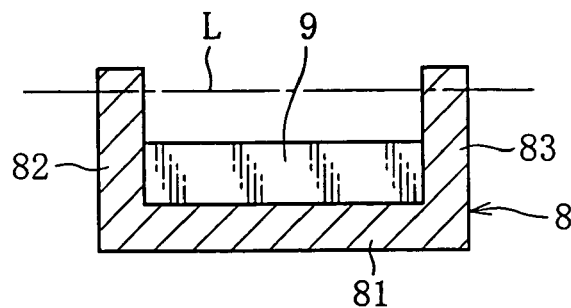
FIGS. 4(a) to 4(e) are vertical sectional front views of the essential part showing baffle plates provided in the branch path as an element of the molten glass supply device according to the embodiment.
Figure 4B:
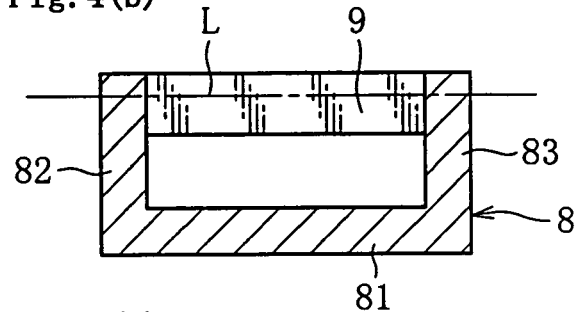
Figure 4C:
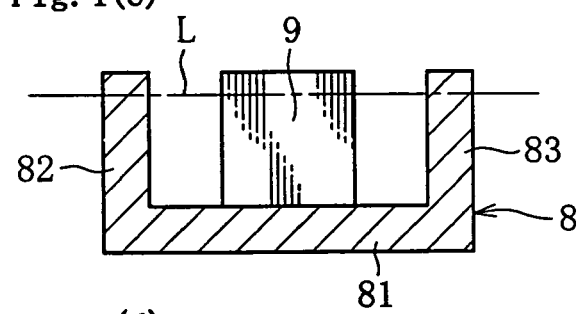
Figure 4D:
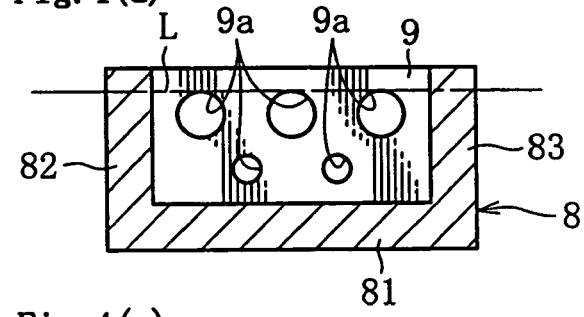
Figure 4E:
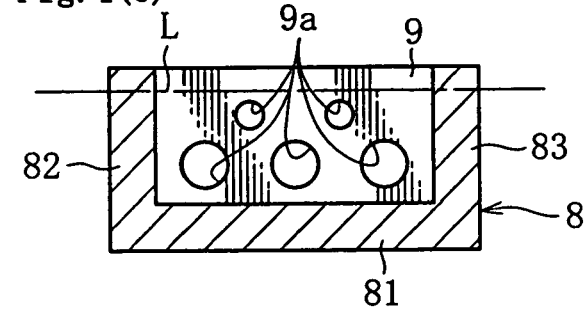
Figure 5:
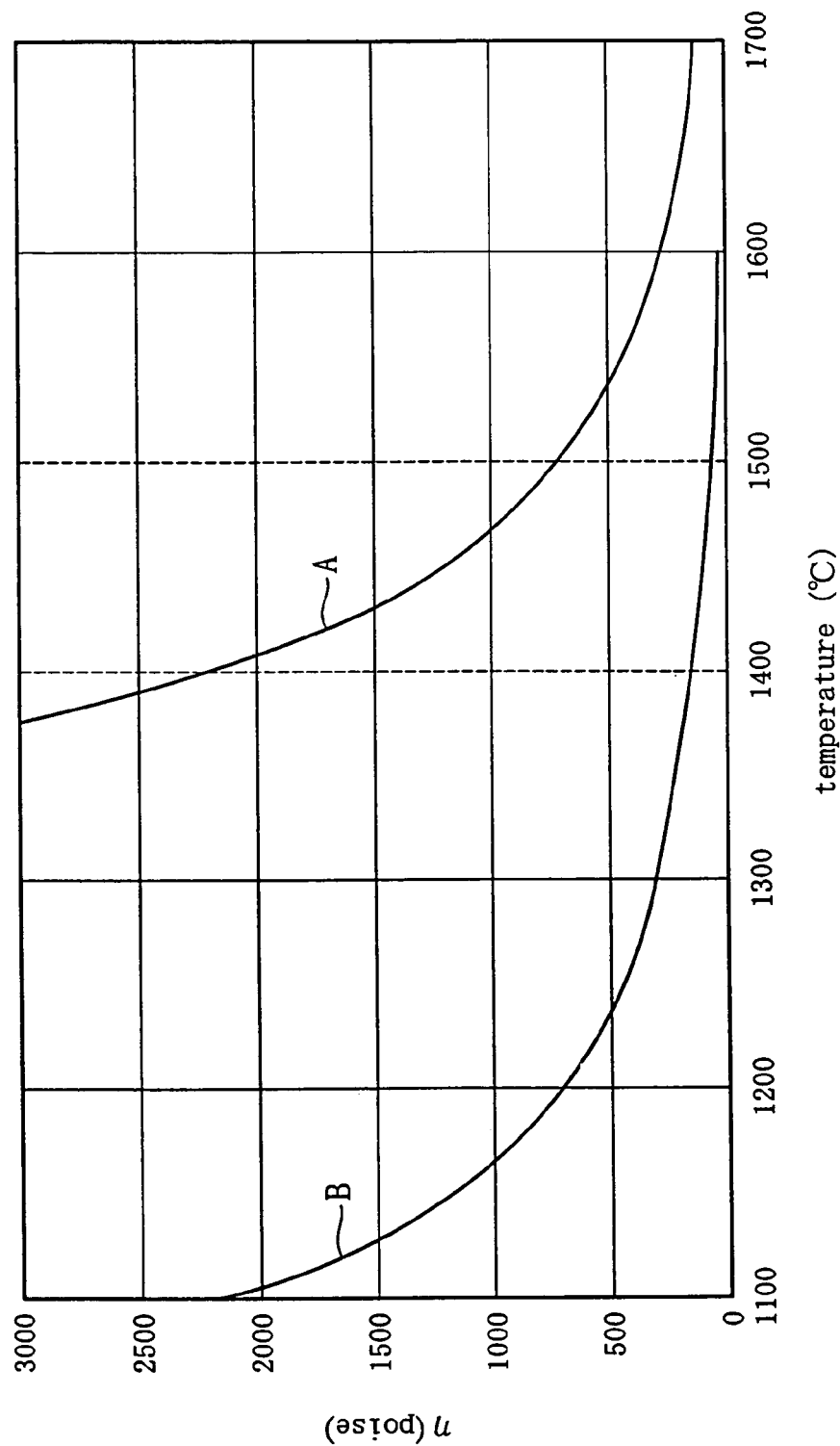
FIG. 5 is a graph showing the comparison of the characteristics of high viscosity glass to which the invention is applied and low viscosity glass according to the conventional technique.

The baffle plate 9 on the uppermost stream side shown in FIG. 4(a) has a rectangular shape covering a section corresponding to approximately the lower half of the section of the rectangular flow path in the distribution resistance providing chamber 8. The plate changes the direction of the flow of the molten glass to upward and then to downward. The baffle plate 9 the second on the upstream side shown in FIG. 4(b) has a rectangular shape covering a section corresponding to approximately the upper half or the upper one third the section of the flow path of the distribution resistance providing chamber 8. The plate changes the direction of the flow of the molten glass to downward to narrow the flow and then to upward. The baffle plate 9 the third from the upstream side shown in FIG. 4(c) has a rectangular shape covering the central part of the section of the flow path of the distribution resistance providing chamber 8 from the top to the bottom except for both sides in the width-wise direction, so that the flow of the molten glass is separated to both sides in the width-wise direction and then again gathered. The baffle plate 9 the fourth from the upstream side shown in FIG. 4(d) has a plurality of through holes 9a whose upper part is relatively large in size in a plate member covering the entire surface of the section of the flow path of the distribution resistance providing chamber 8. In this way, the flow of the molten glass is narrowed in a plurality of locations so that the flow differs between the upper and lower parts and then gathered. The baffle plate 9 the fifth from the upstream side shown in FIG. 4(e) has a plurality of through holes 9a whose lower part is relatively large in size in a plate member covering the entire surface of the section of the flow path of the distribution resistance providing chamber 8. In this way, the flow of the molten glass is narrowed in a plurality of locations so that the flow differs between the upper and lower parts and then gathered. In this way, the flow of molten glass is changed in the direction or narrowed, heat transfer between the low viscosity part and the high viscosity part is positively performed, which improves the heat transfer efficiency. Therefore, the baffle plates 9 can rectify the flow of the molten glass or equalize the viscosity in the distribution resistance providing chamber 8. Consequently, the distribution resistance providing chambers 8 can also serve as a viscosity equalizing chamber (viscosity equalizing portion).

The molten glass supplied from the melting furnace 2 shown in FIGS. 1 and 2 to the forming devices 5 through the distribution chamber 3 and distribution resistance providing chambers 8 preferably has a property in which a temperature at which the molten glass exhibits a viscosity of 1000 poise is 1350° C. or higher, preferably 1420° C. or higher. The glass is preferably non-alkali glass. The strain point of glass is equal to, or more than, 600° C., preferably equal to, or more than, 630° C., and the liquidus viscosity of glass is equal to, or more than, 300000 poise, preferably equal to, or more than, 600000 poise. The glass composition is, for example, in terms of mass % as follows: $SiO_2$: 40% to 70%, $Al_2O_3$: 6% to 25%, $B_2O_3$: 5% to 20%, MgO: 0% to 10%, CaO: 0% to 15%, BaO: 0% to 30%, SrO: 0% to 10%, ZnO: 0% to 10%, alkali metal oxide: 0.1% or less, and fining agents: 0% to 5%. The glass composition in this case is preferably as follows: $SiO_2$: 55% to 70%, $Al_2O_3$: 10% to 20%, $B_2O_3$: 5% to 15%, MgO: 0% to 5%, CaO: 0% to 10%, BaO: 0% to 15%, SrO: 0% to 10%, ZnO: 0% to 5%, alkali metal oxide: 0.1% or less, and fining agents: 0% to 3%.

The forming devices 5 to which molten glass is supplied from the distribution resistance providing chambers 8 through downstream side branch paths 10 are each a forming device for sheet glass such as sheet glass for liquid crystal (glass substrate for a liquid crystal display).

Note that the walls of the above described elements are all made of a high zirconia content refractory material, but the walls of the elements other than the melting furnace 2 may be a refractory material other than the high zirconia content refractory material.

In the molten glass supply device 1 having the above configuration, the plurality of branch paths 4 extend toward the forming devices 5 through the distribution chamber 3 from the melting furnace 2. Therefore, molten glass having high viscosity in the melting furnace 2 is supplied to the forming devices 5 through the corresponding branch paths 4. More specifically, the process includes the steps of melting raw materials to be high viscosity glass in a melting furnace 2, the high viscosity glass having a property in which a temperature at which the molten glass exhibits a viscosity of 1000 poise is 1350° C. or higher; distributing molten glass let out from the melting furnace 2 for supply to the plurality of branch paths 4 through the distribution chamber 3 in communication with the flow outlet 2a of the melting furnace 2; providing distribution resistance to molten glass let to flow through the plurality of branch paths 4; and supplying molten glass passed through the plurality of branch paths 4 to the forming devices 5 in communication with the corresponding branch paths 4 and forming the glass into glass products.

Therefore, the value produced by dividing the heat radiation area of the melting furnace 2 (particularly the heat radiation area of the side walls 22 to 25) by the number of the branch paths 4, in other words, the heat radiation area of the melting furnace 2 per branch path 4 is far smaller than the heat radiation area of a melting furnace per supply flow path of a plurality of single feeders having a plurality of melting furnaces whose total volume is equal to the volume of the melting furnace 2. In this way, the amount of radiated heat from the melting furnace 2 per branch path 4 is not excessive, and the necessary heating cost per forming line can be prevented from improperly increasing. Furthermore, the value produced by dividing the area of the melting furnace 2 at the inner wall surface in contact with molten glass by the number of the branch paths 4, in other words, the erosion area of the melting furnace 2 per branch path 4 is far smaller than the erosion area of the melting furnace per supply flow path in a single feeder. In this way, the amount of an erosion foreign material mixed into the molten glass supplied to the forming devices 5 through the corresponding branch paths or the amount of heterogeneous glass produced by erosion is not excessive, and contamination of molten glass or reduction in the quality of formed products caused by the contamination, and hence reduction in the product yield can be prevented.

In addition, when the plurality of forming devices 5 are of different kinds, different kinds of sheet glass can be formed at a time with the molten glass distributed from the same melting furnace 2 using the plurality of forming devices 5. Furthermore, when the supply of molten glass from one of the branch paths 4 is stopped, molten glass can continue to be supplied through the other branch paths 4 to the corresponding forming devices 5 and the forming step can be carried out as required. Therefore, when the user desires to change one of the lines to the forming devices 5 to form sheet glass in a form different from the other lines, only the branch path 4 corresponding to the line desired to be changed is replaced, and the other forming devices 5 may continue to operate as they are. In addition, the high viscosity glass such as glass for liquid crystal display is formed at high temperatures, and the forming devices and other parts are likely to wear off. When one of the branch paths 4 may be stopped under repair, while the other devices may operate.

Furthermore, the path from the melting furnace 2 branch into the multiple flow paths 4, and therefore additional molten glass supply devices are not necessary. The system can readily address the recent increasing demand for sheet glass. Sheet glass is formed in the same operation and preparation conditions though formed through different branch paths 4 and therefore sheet glass having the same composition or material characteristics can be provided in high volume.

The molten glass let to flow out from the melting furnace 2 to the distribution chamber 3 is subjected to the flames F of the burners radiated in the space above in addition to the natural phenomenon deriving from the relation between the specific gravity and temperature. Therefore, the lower part of the molten glass has a lower temperature and a viscosity relatively higher than the upper part, but the distribution chamber 3 whose bottom is shallower than the melting furnace 2 allows the high viscosity molten glass in the lower part to remain in the melting furnace 2, and only the upper, low viscosity molten glass to flow into the distribution chamber 3. In this way, the molten glass with low viscosity is efficiently used and not wasted, the molten glass may have equal viscosity from the upper to lower parts in the distribution chamber 3, and the release of bubbles contained in the molten glass can be facilitated.

Zirconia, a component of the refractory material eroded by molten glass contacting the melting furnace 2 has a specific gravity larger than the molten glass. Therefore, contaminated molten glass produced by the zirconia mixed into the molten glass is deposited in the lower part. In this case, since the distribution chamber 3 is shallower than the melting furnace 2, so that the contaminated molten glass can appropriately be prevented from coming into the distribution chamber 3.

As the molten glass allowed to come into the distribution chamber 3 is subjected to flames F radiated by the oxygen fuel combustion burners and heated, so that the viscosity of the glass is equal to, or less than, 1000 poise. Therefore, the glass has improved fluidity and can smoothly be distributed and supplied from the distribution chamber 3 to the distribution resistance providing chambers 8 of the branch paths 4. Note that the molten glass allowed to come into the distribution chamber 3 from the melting furnace 2 has its flow prevented by the central rectifying plate 37 of the distribution chamber 3 from running straightforward, suitably spread in the right-and-left direction and then distributed for supply to the distribution resistance providing portions 8. Therefore, the distribution of the molten glass is not concentrated to the distribution resistance providing chamber 8 in the center in the right-and-left direction. The molten glass in the point has its temperature maintained in the range from 1600° C. to 1700° C., higher than both the temperature of the molten glass in the melting furnace 2 (1500° C. to 1650° C.) and the temperature of the molten glass in the distribution resistance providing chambers 8 (1500° C. to 1650° C.). Meanwhile, the anti-heat durability of the inner wall surface of the distribution chamber 3 covered with platinum or a platinum alloy is not lowered and the molten glass is not contaminated by erosion foreign materials or heterogeneous glass.

Furthermore, the distribution resistance providing chambers 8 to which molten glass comes in from the distribution chamber 3 are provided with the plurality of baffle plates 9, which provides suitable resistance to the molten glass passed through these distribution resistance providing chambers 8. Consequently, if the viscosity and flowing direction of the molten glass through the distribution chamber 3 to the distribution resistance providing chambers 8 vary, the pressure when the glass is distributed for supply to the distribution resistance providing chambers 8 is equalized by the above described suitable resistance.

In addition, the flow of the molten glass passed through the distribution resistance providing chambers 8 has its direction changed or is narrowed by the function of the baffle plates 9. Therefore, the heat transfer is promoted among molten glass parts having different viscosity in the distribution resistance providing chamber 8, and the viscosity of the molten glass is equalized. Moreover, in the distribution resistance providing chambers 8, the temperature detection means is used to control the temperature of molten glass, so that molten glass exhibiting a viscosity extremely accurate to the demand can be supplied to the forming devices 5. In this way, the sheet glass formed by the forming devices 5 can be prevented from varying in the thickness or having defects such as waviness.

The invention claimed is:

1. A method of producing a glass product comprising the steps of:
   melting raw materials to obtain high viscosity glass in a melting furnace, the high viscosity glass having a property in which a temperature at which the molten glass exhibits a viscosity of 1000 poise is 1350° C. or higher;
   distributing molten glass coming out from the melting furnace through a distribution portion in communication with an outlet of the melting furnace for supply to a plurality of branch paths; and
   supplying the molten glass passed through the plurality of branch paths to forming devices in communication with the plurality of branch paths and forming glass products.

2. The method of producing a glass product according to claim 1, further comprising the step of providing distribution resistance to the molten glass flowing through the plurality of branch paths.

3. The method of producing a glass product according to claim 1, wherein supply pressures of the molten glass distributed from the distribution portion for supply to the respective branch paths are equalized to each other.

4. The method of producing a glass product according to claim 2, wherein the step of producing distribution resistance is performed in distribution resistance producing portion which at least a surface of an inner wall in contact with the molten glass is made of one selected from the group consisting of platinum, molybdenum, palladium, rhodium, and an alloy thereof.

5. The method of producing a glass product according to claim 4, wherein the molten glass is heated by supplying current through the one selected from the group consisting of platinum, molybdenum, palladium, rhodium, and an alloy thereof.

6. The method of producing a glass product according to claim 2, wherein the distribution resistance is provided by composing a plurality of baffle plate provided in the branch path.

7. The method of producing a glass product according to claim 6, wherein at least a surface of the baffle plate in contact with the molten glass is made of one selected from the group consisting of platinum, molybdenum, palladium, rhodium, and an alloy thereof.

8. The method of producing a glass product according to claim 1, wherein the molten glass in the distribution portion is heated so that the molten glass has a viscosity of 1000 poise or less is provided.

9. The method of producing a glass product according to claim 1, wherein at least a surface of an inner wall of the distribution portion in contact with the molten glass is made of one selected from the group consisting of platinum, molybdenum, palladium, rhodium, and an alloy thereof.

10. The method of producing a glass product according to claim 1, wherein a sheet glass is formed as a glass product.

* * * * *